(12) United States Patent
Ren et al.

(10) Patent No.: US 8,768,391 B2
(45) Date of Patent: Jul. 1, 2014

(54) LOCALISED AND DISTRIBUTED SCHEDULING CONTROL METHOD AND APPARATUS

(75) Inventors: Weili Ren, Reading (GB); Michael Roberts, Reading (GB)

(73) Assignee: NEC Corporation, Tokyo (JP)

( * ) Notice: Subject to any disclaimer, the term of this patent is extended or adjusted under 35 U.S.C. 154(b) by 880 days.

(21) Appl. No.: 12/297,995

(22) PCT Filed: Apr. 20, 2007

(86) PCT No.: PCT/JP2007/059130
§ 371 (c)(1),
(2), (4) Date: Oct. 21, 2008

(87) PCT Pub. No.: WO2007/126034
PCT Pub. Date: Nov. 8, 2007

(65) Prior Publication Data
US 2009/0175226 A1    Jul. 9, 2009

(30) Foreign Application Priority Data

Apr. 24, 2006   (GB) .................................. 0607973.5

(51) Int. Cl.
*H04B 15/00* (2006.01)
(52) U.S. Cl.
USPC .............. 455/504; 455/10; 455/506; 370/329
(58) Field of Classification Search
USPC ........ 455/10, 561, 443, 442, 450, 509, 422.1, 455/436, 445, 464, 437, 343.3, 127.1, 455/552.1; 370/329, 324, 316, 208, 210, 370/328, 343, 401, 236, 278, 522, 331, 370/508; 375/346, 326, 260, 148, 132, 324
See application file for complete search history.

(56) References Cited

U.S. PATENT DOCUMENTS

| 6,771,721 | B1 * | 8/2004 | Rostamy et al. ............... 375/346 |
| 2004/0114552 | A1 * | 6/2004 | Lim et al. ...................... 370/324 |
| 2005/0048979 | A1 * | 3/2005 | Chun et al. ..................... 455/443 |
| 2005/0129105 | A1 | 6/2005 | Papasakellariou |

(Continued)

FOREIGN PATENT DOCUMENTS

| EP | 1631112 A1 | 3/2006 |
| JP | 2006-050545 A | 2/2006 |

(Continued)

OTHER PUBLICATIONS

Japanese Office Action issued Nov. 2, 2011 by the Japanese Patent Office in corresponding Japanese Application No. 2008-548904.

(Continued)

*Primary Examiner* — Edward Urban
*Assistant Examiner* — Golam Sorowar
(74) *Attorney, Agent, or Firm* — Sughrue Mion, PLLC

(57) ABSTRACT

The present invention provides for a method of controlling selection of a localised scheduling scheme or a distributed scheduling scheme within an OFDMA downlink and including the step of estimating a fading characteristic and initiating switching between the scheduling schemes responsive to the result of the said estimation, wherein the fading characteristic can comprise one of fading rate or fading type, and wherein the invention can provide for such estimating functionality within a mobile radio communications device.

6 Claims, 2 Drawing Sheets

(56) References Cited

U.S. PATENT DOCUMENTS

| | | | |
|---|---|---|---|
| 2005/0159162 A1* | 7/2005 | Park | 455/450 |
| 2005/0197080 A1 | 9/2005 | Ulupinar et al. | |
| 2006/0079184 A1 | 4/2006 | Do et al. | |
| 2006/0239180 A1* | 10/2006 | Khan et al. | 370/208 |
| 2006/0280113 A1* | 12/2006 | Huo | 370/208 |
| 2007/0053449 A1 | 3/2007 | Adachi | |
| 2007/0149249 A1* | 6/2007 | Chen et al. | 455/561 |
| 2007/0297386 A1* | 12/2007 | Zhang et al. | 370/344 |

FOREIGN PATENT DOCUMENTS

| | | |
|---|---|---|
| WO | 2005/036790 A1 | 4/2005 |
| WO | 2006/137495 A1 | 12/2006 |
| WO | WO 2007062754 A1 | 6/2007 |

OTHER PUBLICATIONS

LG Electronics, "Downlink resource allocation in EUTRA," 3GPP TSG RAN WG1 AH on LTE, R1-060052, Jan. 23, 2006-Jan. 25, 2006, Helsinki, Finland.

LG Electronics, "Downlink resource allocation," 3GPP TSG RAN WG1#42, R1-050835, Aug. 29-Sep. 2, 2005, London, United Kingdom.

Nokia, "Resource block allocation—mapping rules," 3GPP TSG RAN WG1#44 Meeting, R1-060286, Feb. 13-Feb. 17, 2006, Denver, USA.

Samsung, "Downlink Channelization and Multiplexing for EUTRA," 3GPP TSG RAN WG1 Ad Hoc on LTE, R1-050604, Jun. 20-Jun. 21, 2005, Sophia Antipolis, France.

Search Report, dated Feb. 5, 2014, issued by the European Patent Office, in counterpart Application No. 07742565.

"Uplink Transmission and Multiplexing for Eutra", Samsung, 3GPP TSG RAN WG1 Ad Hoc on LTE, Sophia-Antipolis, France, Jun. 20-21, 2005, 6 pages.

"An Adaptive Antenna for Spatial-Domain Path-Diversity", Ogawa, et al., Vehicular Technology Conference, 1998, VTC 98, 48th IEEE, Ottawa, Ontario, Canada, May 18-21, 1998, pp. 544-547.

"Bit-Stream-Arranged Weighted Modulation Scheme for Frequency Selective Fading Channels", Kobayashi, et al., Global Telecommunications Conference, 1996, Globecom 96, The Key to Flobal Prosperity, London, UK, Nov. 18-22, 1996, pp. 1258-1262.

"Improving Signal Capture of CMA Adaptive Array Using Weight Norm Control", Kikuma, et al., Antennas and Propagation, 10th International Conference, Edinburgh, UK, Apr. 14-17, 1997, pp. 502-505.

* cited by examiner

LOCALISED AND DISTRIBUTED SCHEDULING CONTROL METHOD AND APPARATUS

TECHNICAL FIELD

The present invention relates to the selection of one of a localised scheduling scheme or distributed scheduling scheme within a network employing Orthogonal Frequency Division Multiple Access (OFDMA). In particular the present invention provides for a method of controlling selection of one of the aforesaid scheduling schemes and, more importantly, a network device, such as User Equipment (UE) in the form of a mobile phone handset can be arranged for providing such control.

BACKGROUND OF THE INVENTION

It is known that in relation to a Long Term Evolution (LTE) OFDMA downlink channel the eNodeB Multiple Access Control (MAC) scheduler is arranged to allocate time/frequency downlink shared channel (DL-SCH) resources among a plurality of UE devices based upon a Channel Quality Indicator (CQI) report received from the UE devices. Such allocation from the eNodeB MAC scheduler can also be determined by other factors such as Quality of Service (QoS) requirements and priorities of the UE devices and buffer occupancy in eNodeB MAC for the UE devices. It is further known that the eNodeB MAC scheduler can be arranged to adopt one of two scheduling schemes. A localised scheduling scheme is employed for slow-moving UE devices, whereas a distributed scheduling scheme is employed for fast-moving UE devices. The eNodeB MAC scheduler selects the particular scheduling scheme that it considers most appropriate for the particular UE based upon CQI reports received from the UE.

The frequency/time allocation within OFDMA is achieved on the basis of resource blocks, wherein one block contains the plurality of sub-carriers. For the above-mentioned localised scheduling, consecutive sub-carriers are employed, whereas for the distributed scheduling, non-consecutive sub-carriers are allocated to a resource block.

However, it is considered that the current selection and employment of the aforementioned scheduling schemes exhibits disadvantageous limitations in view of the potentially high signalling overhead that can arise in uplink and due to degradation of overall system performance that can be experienced.

DISCLOSURE OF INVENTION

The present invention seeks to provide for a method, and related apparatus, allowing for the adoption of either a localised scheduling scheme or a distributed scheduling scheme which exhibits advantages over current arrangements.

According to a first aspect of the present invention, there is provided a mobile radio communications device arranged for network connection with a OFDMA downlink channel and including means arranged for estimating a signal-fading characteristic and for initiating switching between a localised scheduling scheme and a distributed scheduling scheme by way of a request to the network, such initiation being responsive to the result of the said estimation.

The present invention is advantageous insofar as it allows for accurate and timely indications to be provided from the UE such as the mobile radio communications device to initiate switching between the two scheduling schemes so as to balance signalling overhead and therefore seeks to maintain overall system performance.

The mobile radio communications device is advantageously arranged to estimate the fading characteristic once each sub-frame.

In particular, such estimation can be based upon signal-noise ratio measurements of pilot symbols.

Yet further, the aforementioned estimation can advantageously be performed in three steps comprising the basic signal-noise ratio measurement, and estimation of fading type, and an estimation of fading rate.

With an estimation of fading rate, the value estimated is compared with a threshold value.

Advantageously, if the estimated rate is higher than the threshold value then the mobile radio communications device is arranged to initiate signalling requesting at the distributed scheduling scheme employed.

If the estimation includes estimation of fading type, the estimation is arranged to determine if the fading type is frequency-selective.

Advantageously, if the fading type is estimated to be frequency-selective, the initiation from the mobile radio communications device is arranged to initiate a request to network that a distributed scheduling scheme be employed.

Advantageously, the mobile radio communications device is arranged to receive parameters from the network comprising:
- a threshold for maximum difference of signal-noise ratio measurement of the pilot symbols within a resource block;
- a threshold for maximum number of resource blocks in which the maximum difference of signal-noise radio measurements is greater than the above-mentioned threshold;
- a threshold for fading variation per sub-frame of a pilot symbol; and
- a threshold for a net number of pilot symbols on which fading variation per sub-frame exceeds the aforementioned threshold.

Advantageously, the mobile radio communications device is arranged to receive the above-mentioned parameters by direct signalling per device.

Alternatively, the mobile radio communications device can be arranged to receive the aforementioned parameters by means of broadcast signalling, for example by way of the BCCH.

According to another aspect of the present invention, there is provided a method of controlling selection of a localised scheduling scheme or a distributed scheduling scheme within an OFDMA downlink and including the step of estimating a fading characteristic and initiating switching between the scheduling schemes responsive to the result of the said estimation.

Advantageously, the aforementioned estimation is conducted within a mobile radio communications device and the aforesaid initiation of switching between the scheduling schemes comprises a request sent to the network from the mobile radio communications device for such switching.

Advantageously the fading characteristic is estimated once each sub-frame.

In particular, such estimation can be based upon signal-noise ratio measurements of pilot symbols.

Yet further, the aforementioned estimation can advantageously be performed in three steps comprising the basic signal-noise ratio measurement, and estimation of fading type, and an estimation of fading rate.

With an estimation of fading rate, the value estimated is compared with a threshold value.

Advantageously, if the estimated rate is higher than the threshold value signalling is initiated requesting that the distributed scheduling scheme be employed.

If the estimation includes estimation of fading type, the estimation is arranged to determine if the fading type is frequency-selective.

Advantageously, if the fading type is estimated to be frequency-selective, signalling is initiated that a distributed scheduling scheme be employed.

Advantageously, the method includes the transfer of parameters from the network comprising:
- a threshold for maximum difference of signal-noise ratio measurement of the pilot symbols within a resource block;
- a threshold for maximum number of resource blocks in which the maximum difference of signal-noise radio measurements is greater than the above-mentioned threshold;
- a threshold for fading variation per sub-frame of a pilot symbol; and
- a threshold for a net number of pilot symbols on which fading variation per sub-frame exceeds the aforementioned threshold.

Advantageously, the above-mentioned parameters are arranged to be transmitted by direct signalling per device.

Alternatively, the aforementioned parameters can be transmitted by means of broadcast signalling, for example by way of the BCCH.

As will therefore be appreciated from the above, the present invention advantageously proposes that each active UE can be arranged to estimate the fading rate and/or fading type that is experienced once per sub-frame and also based on the historic signal-noise ratio measurement of the pilot symbols.

When the fading rate is estimated to exceed a particular threshold, the UE is arranged to send a request to the eNodeB to communicate that a distributed scheduling scheme would more effectively be employed if a localised scheduling scheme is currently being employed. Of course, in instances where the estimated fading rate drops below the aforementioned threshold, the UE is arranged to send a request that the localized scheduling scheme be employed.

The correct and timely UE indications to switch between the two scheduling schemes advantageously serve to balance the uplink signalling overhead caused by CQI reporting and multi-user diversity that is achieved by using localised scheduling.

BEST MODE FOR CARRYING OUT THE INVENTION

The invention is described further hereinafter, by way of example only, with reference to the accompanying drawing which represents a flow-diagram illustrating operation of an estimation algorithm for fading rate and type and as employed in accordance with an embodiment of the present invention.

First however, further discussion is provided concerning the specific features the background of the present invention.

Figure 1:
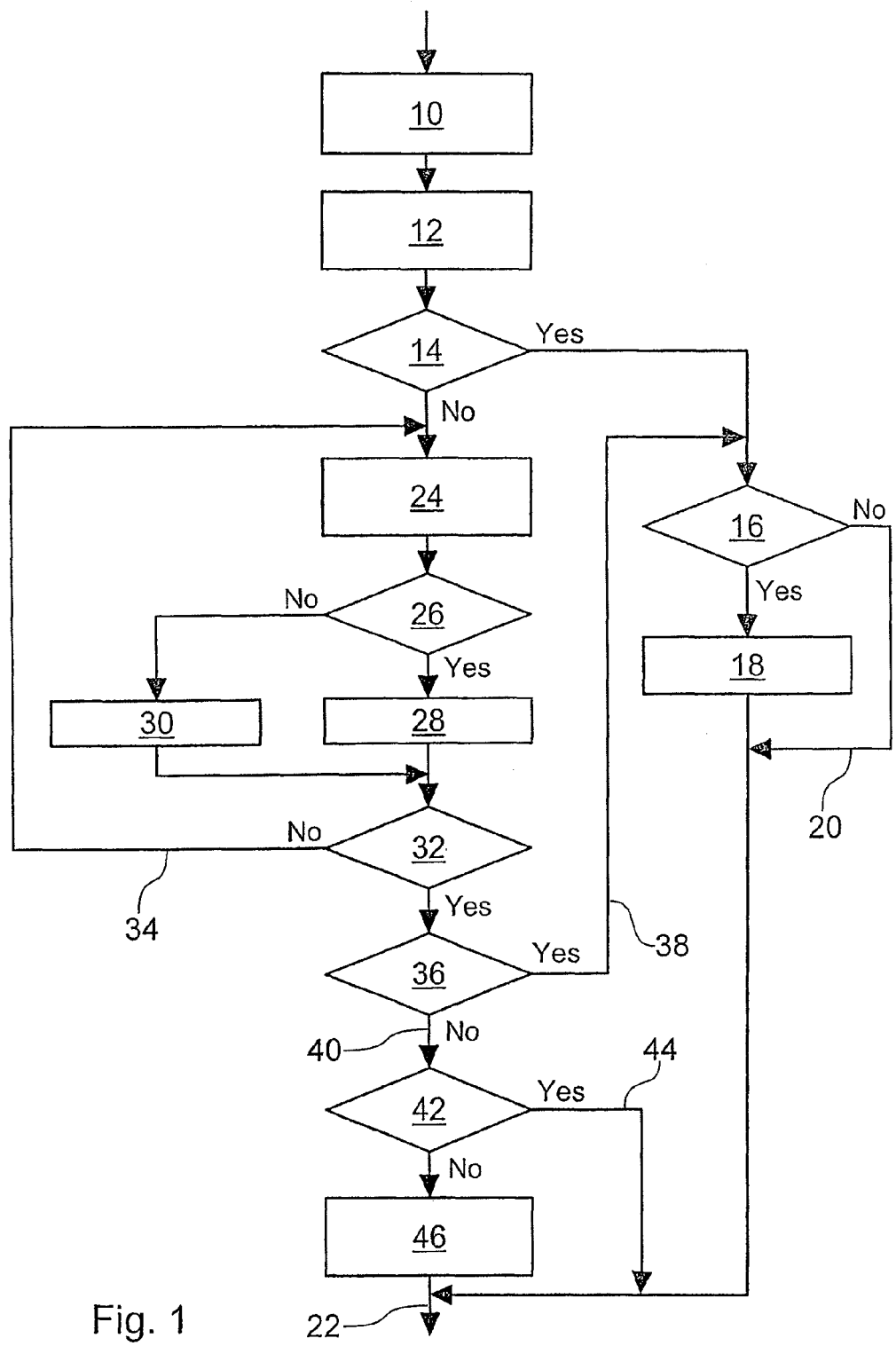
FIG. 1 is a flow-diagram illustrating operation of an estimation algorithm for fading rate and type and as employed in accordance with an embodiment of the present invention.
Figure 2:
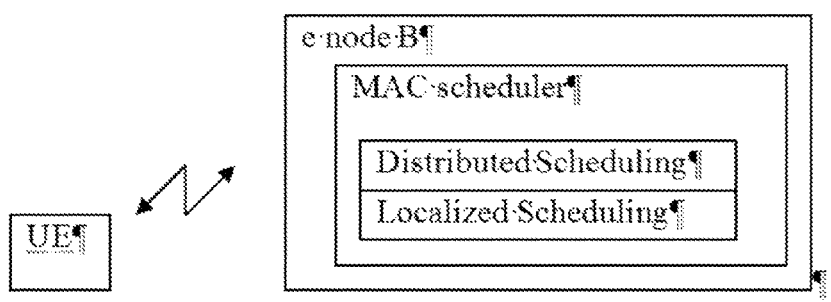
FIG. 2 is an exemplary embodiment of an eNodeB MAC scheduler.

FIG. 2 shows an exemplary embodiment of an eNodeB MAC scheduler. As mentioned, in an LTE OFDMA downlink connection, the eNodeB MAC scheduler is arranged to dynamically allocate time/frequency DL-SCH resources among UE devices, based on various factors such as QoS requirements and priorities of the UE devices, buffer occupancy in eNodeB MAC for the UE devices, CQI feedback from the UE devices, and the UE capabilities, etc. The allocations are made by localised and distributed scheduling, and performed every TTI, a minimum of sub-frame, in order to maintain channel quality experienced by different UE devices. The localised scheduling allocates to a UE a set of resource blocks, each consisting of a number of contiguous sub-carriers (e.g. 25). Within these resource blocks, the UE can obtain the best channel condition, so that eNodeB can utilise the system spectrum most efficiently by adopting a high-rate modulation and coding scheme. The localised scheduling is suitable to be used in the slow-varying channel experienced by slow moving UE devices to avoid too frequent CQI feedback. The distributed scheduling allocates to UE a set of resource blocks, each consisting of a number of sub-carriers arbitrarily distributed over the entire frequency band. The distributed scheduling offers maximal frequency diversity and can reliably operate for a relatively long period of time. Further it is not sensitive to the channel quality variation as long as low-rate modulation and coding schemes are used. However limitations are experienced in that the system spectrum cannot be efficiently employed. The distributed scheduling is suitable to be used in the fast fading channel such as that experienced by fast moving UE devices. It is also considered to represent the best choice in the frequency-selective fading channel, which is caused by a large time delay spread of multi-path transmissions.

The CQI report from each active UE serves to indicate to eNodeB that what modulation and coding scheme are expected in every resource block for the next scheduling period, a minimum of sub-frame. The UE devices derive CQI value, based on signal-noise ratio measurement of pilot symbols, which, in the current version of TR 25.814 of the 3GPP specification, are arranged one per six sub-carriers over the entire band, and repeated once per sub-frame. To support the localised scheduling, eNodeB requires that an active UE report individual CQI values, each per resource block, in order to identify and select the best suitable resource blocks for the UE in the next TTI. To support the distributed scheduling, eNodeB only requires that the UE report an overall CQI that indicates the overall channel quality over the entire band. CQI variation over a short-term is mainly caused by the channel fading, whose rate is closely correlated to the moving speed of a UE, although changing objects around a stationary UE can also contribute to the fading. CQI variation over frequency is caused by the channel delay spread the magnitude of which can be large enough to bring about frequency-selective fading within a resource block (25*15=375 kHz). On this basis, not all sub-carriers in a block experience fading correlatively. In this case the distributed scheduling is also offers a better option than localized scheduling. Whether or not the fading is frequency-selective depends on the channel environment in which the UE is located, rather than the moving speed of the UE.

Timely and detailed CQI reporting from each active UE can assist eNodeB MAC scheduler to utilise the system spectrum particularly efficiently and to achieve the maximal multi-user diversity, but it can also bring about a considerable signalling overhead, resulting in degradation of overall system performance. When a UE moves slowly, the fading variation it experiences is slow, and CQI in each resource block varies slowly as well. The UE is supposed to report the individual CQIs every sub-frame to gain a full multi-user diversity, but if most of the CQI values do not vary over quite a few sub-frames, the actual relevant bits in the individual CQI report are minimal, and the CQI reporting is likely to be less often. The faster the UE is moving, the faster the fading variation that is experienced and the more often individual CQI reporting is required. Therefore correct and timely switching between the two scheduling methods can minimise CQI reporting.

The present invention proposes that the UE estimates the fading it experiences once per sub-frame, and then sends a request to eNodeB when it thinks necessary to switch from one scheduling method to the other, based on its estimation of fading rate and type. The UE can estimate the fading it is experiencing more effectively than eNodeB. This is a particular aspect of the present invention insofar as the required estimation is conducted within the UE itself.

As noted, the UE is arranged to estimates the fading rate and type every sub-frame, based on SNR measurement of pilot symbols. When the fading rate is estimated to be high, i.e. exceeding a threshold, or the fading type is estimated to be frequency-selective, the UE sends a request to eNodeB to indicate that distributed scheduling is considered a more appropriate option to balance UL signalling overhead and multi-user diversity if it is currently receiving localised scheduling. When the estimated fading rate drops below the threshold, the UE sends a request for switching back to the localised scheduling again. A fast and effective estimation algorithm for fading rate and type is required, and a fading threshold is to be defined for the switching.

By placing this algorithm in the UE (rather than the eNodeB) it is possible to reduce processing power in the eNodeB and hence the cost of eNodeB is reduced.

Outlined below is an example of estimation algorithm for fading rate and type that embody the present invention. In order to control this algorithm at least the following parameters are necessary to be provided by the network either by dedicated signalling i.e. per a UE, or by broadcast signalling, i.e. via the BCCH or a mix of both.

T—Threshold for maximum difference of SNR measurement of pilot symbols within a resource block.

Y—Threshold for maximum number of resource blocks, in which maximum difference of SNR measurements>T D—Threshold for fading variation per sub-frame on a pilot symbol C—Threshold for net number of pilot symbols, on which fading variation per sub-frame exceeds D.

Each UE performs the algorithm once per sub-frame in three steps:

(1) Basic Measurements

UE measures SNR on each pilot symbol, as a result of physical layer procedure, and groups them in resource block. UE needs to record the measurements taken in previous sub-frame as well.

(2) Estimation of Fading Type

UE does the calculation $$t^i = (\{p_1^j, p_2^j, \ldots, p_n^j\}_{max} - \{p_1^j, p_2^j, \ldots, p_n^j\}_{min}) / \{p_1^j, p_2^j, \ldots, p_n^j\}_{max}$$

in each group to find out how many resource blocks are experiencing frequency-selective fading to some extent, then decides whether the distributed scheduling has to be requested or not.

(3) Estimation of Fading Rate

A fading counter c is defined with initial value of 0. For all measurements samples $p_i^j(k)$, $i \in (1, n)$, $j \in (1, m)$, UE does the calculation.

$$\Delta d = abs(p_i^j(k) - p_i^j(k-1))$$

where k denotes the current sub-frame and k−1 the previous sub-frame. c increments or decrements, based on if Δd>fading variation threshold D for each measurement sample. When the accumulative calculation is completed, UE checks if c>C to decide if the fading is so fast that the distributed scheduling is more effective to be requested.

It should of course be appreciated that fading rate is traditionally measured by level-crossing rate, which requires that the UE track and store measurements for a period of time, e.g. N sub-frames in order for the UE to calculate the level (usually is the medium value over this short-term) and times of level-crossing. N has to be large enough to make the statistical computation meaningful, but should be limited since large N results in many measurements being stored in the UE and also causes the fading rate estimation to be well behind what is actually is.

Turning now to the accompanying drawing the aforementioned description is further illustrated by the accompanying flow diagram in which, at step 10 the UE is arranged to measure the signal-noise ratio on each pilot symbol and in which the results are grouped in resource block and a fading counter is set to zero. At step 12, a calculation serving to estimate the fading type is conducted and if, at step 14, the result indicates that the fading type is a frequency-selective fading for more than the threshold number of groups of results, then the process continues to step 16 at which it is determined whether or not the UE was previously receiving localised scheduling. If, at 16, it is determined that the UE was not previously receiving localised scheduling, then the process continue by way of arrow 20 to final stage 22 at which the previous distributed scheduling scheme in place is retained.

However, if at step 16, it is determined that the UE was previously receiving localised scheduling, the UE is arranged at step 18 to initiate a request to the eNodeB within the network for switching the scheme to a distributed scheduling scheme. Such a request is then delivered at the final stage 22.

Returning to step 14, if it was there determined that the estimate of the fading type did not indicate frequency-selective fading for a threshold number of groups of results, then it is determined that the UE is suffering so-called flat-fading and the procedure continue to step 24 where an estimation of the fading variation is conducted. The result of this estimation is compared with a fading variation threshold value at step 26 and, if the threshold value is exceeded, the process continues to step 28 where the fading counter is incremented by the value of one. However if at 26 it is determined that the estimation of the fading variation does not exceed the threshold value then the process continues to step 30 where the fading counter is decremented by a value of one.

Once the fading counter has either been incremented at step 28, or decremented at step 30, it is determined at 32 whether or not the particular estimation loop is complete. If it is considered to be incomplete, the process returns via step 34 to perform a further estimation of fading variation at step 74.

However, if at step 32 it is determined that the loop is complete, the process continues to step 36 where it is determined whether the fading counter is now greater than a threshold value to determine whether or not the UE is experiencing fast or slow fading. If the threshold value is exceeded at step 36, then it is considered that the UE is experiencing fast fading and the process returns via 38 to step 16 to ensure that the distributed scheduling scheme remains employed, or that the switch is made to the distributed scheduling scheme if the localised scheduling scheme had been employed.

However, if at step 36, it is determined that the fading counter has not exceeded the threshold value, it is considered that the UE is experiencing slow fading and the process continues via 40 to step 42 where it is determined whether or not the UE was previously receiving localised scheduling.

If, at step 42, it is determined that the UE was previously receiving localised signalling, then the procedure continues via 44 to retain the use of localised scheduling.

If it is determined that the UE was not previously receiving localised scheduling, i.e. that it was receiving distributed scheduling, then, at step 46, the UE is arranged to send a request to the eNodeB within the network for switching to the localised scheduling scheme and such confirmation is provided at final stage 22.

The invention claimed is:

1. A mobile radio communications device which establishes network connection with an OFDMA downlink channel comprising:
   a processor configured to:
      estimate a signal-fading characteristic;
      send a request to the network without sending a result of the estimation to cause initiation of switching between a localized scheduling scheme and a distributed scheduling scheme, the request being responsive to the result of the estimation; and
      receive parameters from the network comprising:
      (i) a threshold for maximum difference of signal-noise ratio measurement of pilot symbols within a resource block;
      (ii) a threshold for maximum number of resource blocks in which the maximum difference of signal-noise radio measurements is greater than threshold value (i);
      (iii) a threshold for fading variation per sub-frame of a pilot symbol; and
      (iv) a threshold for a net number of pilot symbols on which fading variation per sub-frame exceeds threshold value (iii).

2. The device as claimed in claim 1, wherein the processor is configured to receive the above-mentioned parameters by direct signaling.

3. The device as claimed in claim 1, wherein the processor is further configured to receive the aforementioned parameters by means of broadcast signaling.

4. A method of controlling selection of a localized scheduling scheme or a distributed scheduling scheme within an OFDMA downlink comprising:
   estimating a fading characteristic that is conducted within a mobile radio communications device;
   sending a request from the mobile radio communications device to a network without sending a result of the estimation to cause initiation of switching between the scheduling schemes responsive to the result of the estimation; and receiving parameters from the network comprising:
   (i) a threshold for maximum difference of signal-noise ratio measurement of pilot symbols within a resource block;
   (ii) a threshold for maximum number of resource blocks in which the maximum difference of signal-noise radio measurements is greater than threshold value (i);
   (iii) a threshold for fading variation per sub-frame of a pilot symbol; and
   (iv) a threshold for a net number of pilot symbols on which fading variation per sub-frame exceeds threshold value (iii).

5. The method as claimed in claim 4, wherein the parameters are received by means of direct signaling.

6. The method as claimed in claim 4, wherein the parameters are received by means of broadcast signaling.

* * * * *